May 12, 1925. 1,537,570
D. H. WOODWARD ET AL
INSECT EXTERMINATOR
Filed June 22, 1923  3 Sheets-Sheet 1
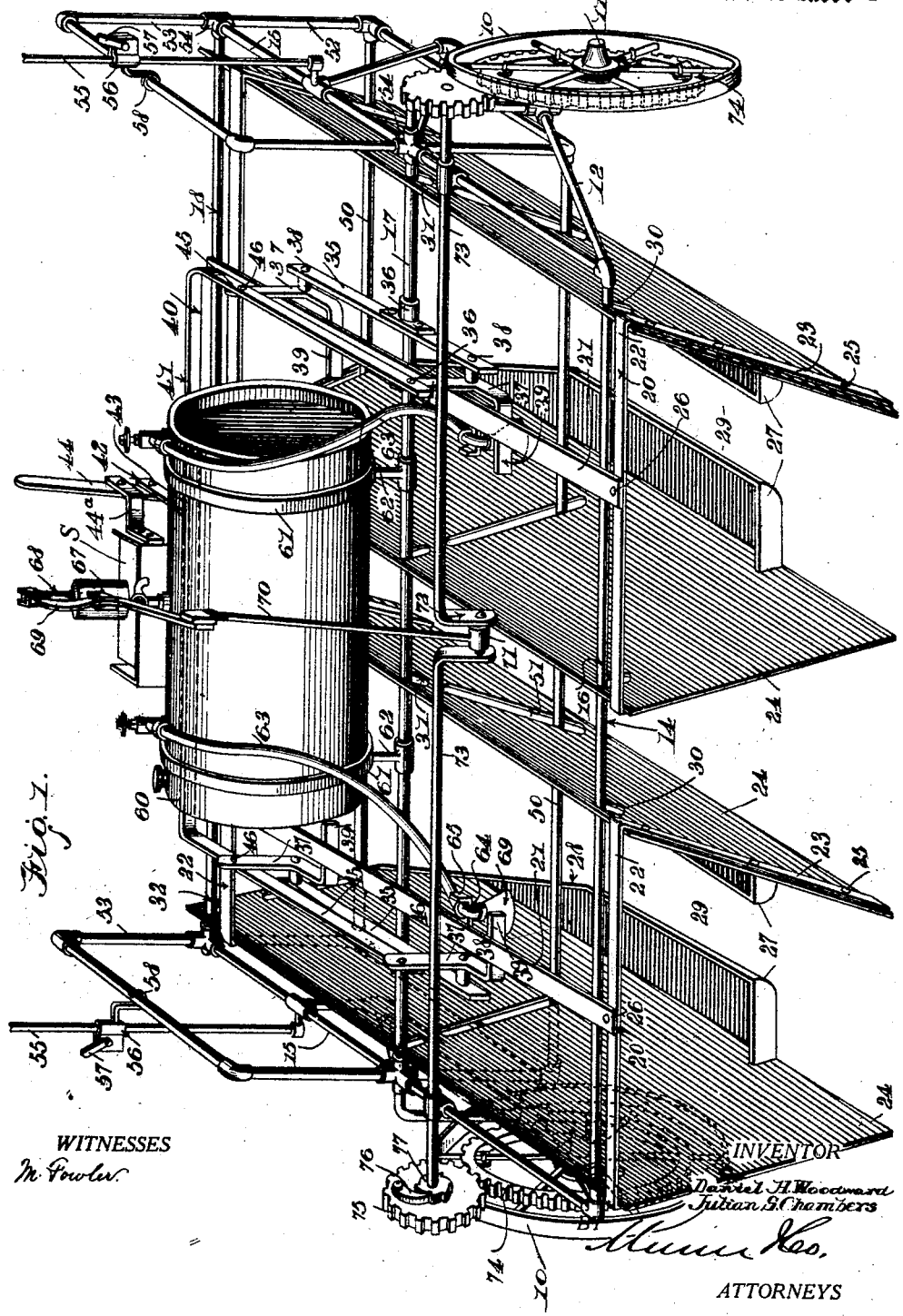

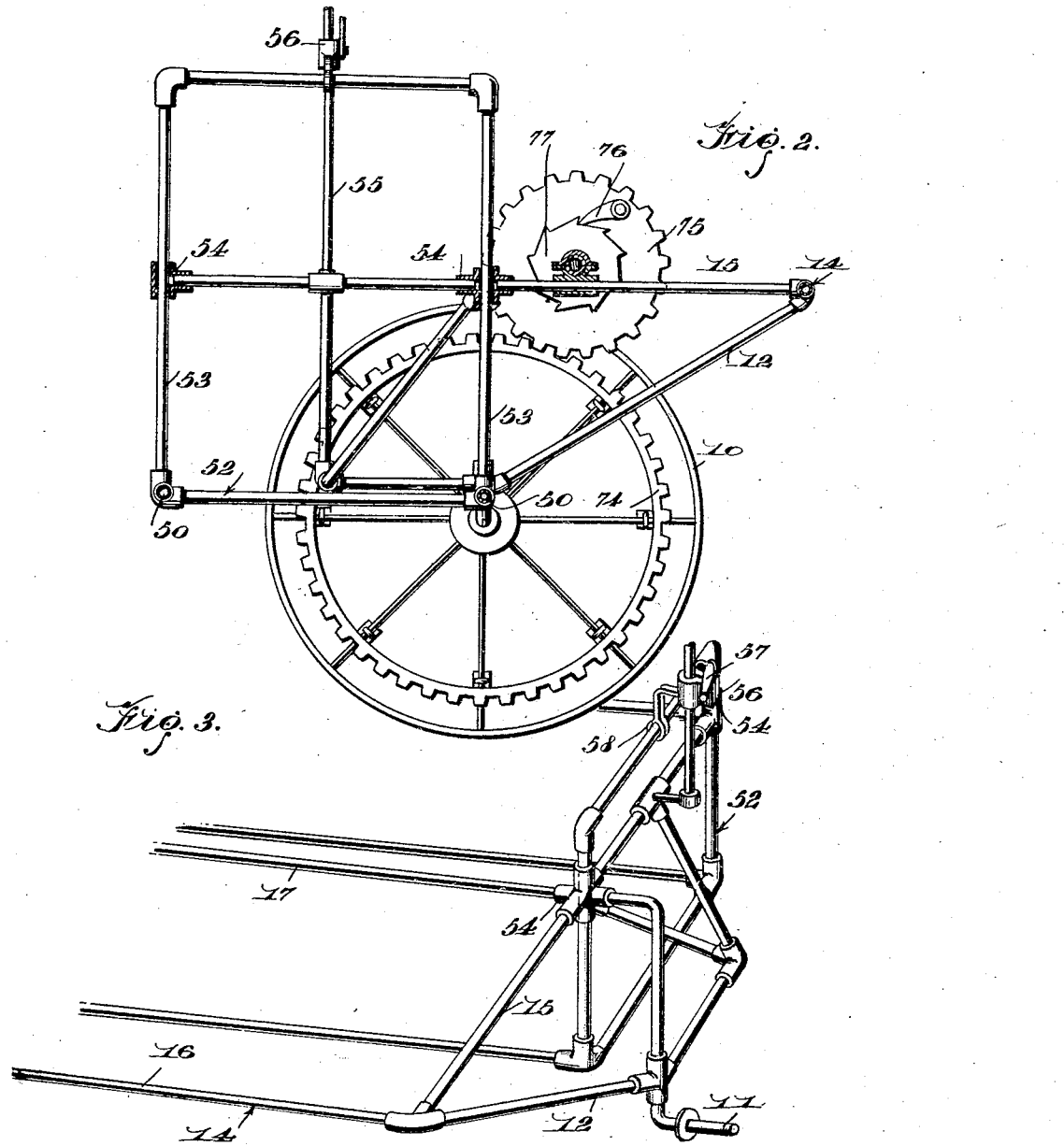

May 12, 1925.  
D. H. WOODWARD ET AL  
INSECT EXTERMINATOR  
Filed June 22, 1923  
1,537,570  
3 Sheets-Sheet 3
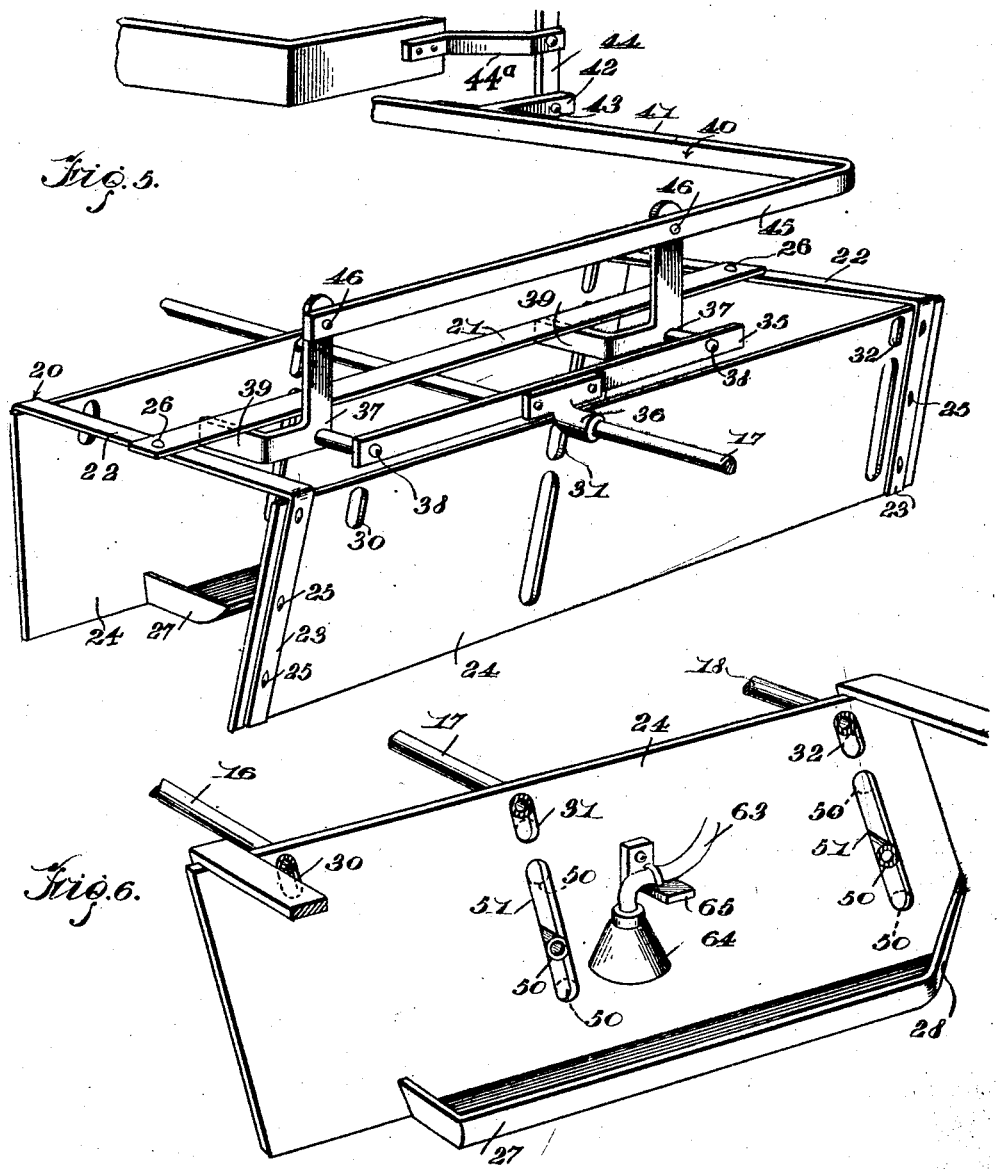
WITNESSES  
M. Fowler
INVENTOR  
Daniel H. Woodward  
Julian G. Chambers.  
BY  
Munn & Co.  
ATTORNEYS Patented May 12, 1925.

1,537,570

UNITED STATES PATENT OFFICE.

DANIEL HOOK WOODWARD AND JULIAN SIDNEY CHAMBERS, OF ATLANTA, GEORGIA.

INSECT EXTERMINATOR.

Application filed June 22, 1923. Serial No. 647,098.

*To all whom it may concern:*

Be it known that we, DANIEL H. WOODWARD and JULIAN S. CHAMBERS, citizens of the United States, and residents of Atlanta, in the county of Fulton and State of Georgia, have invented certain new and useful Improvements in Insect Exterminators, of which the following is a specification.

This invention relates to an insect exterminator which is especially adapted and designed for use in checking and exterminating boll weevil.

The object of the invention is to provide an exterminator of this character which is adapted to be drawn over the field of cotton or other vegetation to be treated and which when so drawn will accommodate itself to irregularities in the contour of the ground as well as irregularities in the formation of the rows of cotton without in any wise impairing the efficacy of the exterminating action of the machine and which operates to exterminate or check the boll weevil by dislodging the insects from the cotton plants and catching and killing the same and also by treating the plants and the ground around the same with a spray of poison in the form of a powder, liquid or in any other suitable form.

Another object is to provide an insect exterminator of this character and having the foregoing advantages and which at the same time is adjustable and controllable so as to be adapted for use under varying conditions and so as to be adapted for convenient transportation from place to place, the machine being at the same time of simple, durable construction, reliable in operation and adapted for comparatively inexpensive manufacture from materials and by facilities ordinarily available.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, showing the preferred embodiment of the invention;

Figure 2 is a fragmentary view in section, showing the manner in which the adjustable frame is mounted on the main frame;

Figure 3 is a fragmentary perspective view of one side of the machine, the wheel and other parts being omitted;

Figure 4 is a detail view of the clamp for the adjustable frame, showing the same in fragmentary perspective;

Figure 5 is a detail perspective view of an exterminating unit and the parts of the lifting mechanism coacting therewith; and Figure 6 is a similar view of one side of the deflecting plate together with its pan and associated structure of the exterminating unit shown in Figure 5.

Referring to the drawings wherein for the sake of illustration is shown the preferred embodiment of the invention, the numeral 10 designates a pair of ground wheels rotatably mounted on stub axles 11 which extend horizontally from side frame members 12. The side frame members 12 are made up of a number of tubular bars connected by suitable couplings and depending from each side of a main frame member 14. The frame member 14 includes a pair of side bars 15 and a number of cross bars, designated at 16, 17 and 18, the cross bars and the side bars being connected by suitable couplings.

A pair of exterminating units is carried by the main frame 14 and as these units are of identical construction a common description will apply to both. Each unit includes a frame, designated generally at 20 and made up of a longitudinal bar 21 which extends longitudinally of the frame and above the cross bars 16, 17 and 18 and which is suitably secured to and carries inverted and substantially U-shaped frame members 22. The inverted U-shaped frame members 22 have their depending legs 23 slightly converging toward each other so that the deflecting plates 24 carried by these legs 23 incline or converge toward their lower ends. It is to be understood that the plates 24 are riveted or otherwise suitably secured to the legs 23, as indicated at 25 and similarly the body portion of the frames 22 are riveted or otherwise suitably secured to the longitudinal bar 21, as indicated at 26. Each plate 24 carries a pan 27 at its lower edge, the forward portion of the pan 27 having a guide surface 28, and these pans defining between them a passage 29 in which the cotton plants are accommodated. Poison is contained in the pans 27 so that these pans together with the plates 24 constitute catchers and also means for killing the insects. It is proposed to support each unit on the cross bars 16, 17 and 18 of the main frame and to support these units in such manner that they can ordinarily partake of the necessary vertical movement so as to accommodate themselves to irregularities in the contour of the ground and also to move sidewise toward and away from each other so as to accommodate themselves to the irregularities in the rows of cotton plants. For this purpose each plate 24 of each unit is provided with a plurality of vertical slots, designated at 30, 31 and 32, and these vertical slots receive respectively the cross bars 16, 17 and 18. In the normal position of a unit the upper wall of the slots 30, 31 and 32 of the side plates 24 engage and rest upon the cross bars 16, 17 and 18, respectively to support the unit. At the same time the slots permit the units to move as a whole vertically or laterally. Each unit is constrained to movement as a whole by virtue of the organization of the plates with the frames 20. If desired the frames 20 may be constructed of resilient metal to give these parts some resiliency although ordinarily the parts are substantially rigid. It is to be understood that shafts, a singletree or doubletree are associated with the main frame member for drawing the machine across the field and for transporting the machine from place to place. When transporting the machine from place to place it is desirable to have the exterminating units elevated well above the ground, it being understood that it is ordinarily desirable to have the lower ends of the units disposed close to or engaging the surface of the ground. Means is provided for lifting or elevating the units well above the ground during the transporting of the machine from place to place and preferably such means comprises a pair of supporting bars 35 mounted upon brackets 36 on the cross bar 17. Each supporting bar 35 carries adjacent its outer end a bell crank lever 37, each bell crank lever 37 being fulcrumed, as at 38, adjacent an end of the bar 35. The bell crank levers 37 each have one arm provided with a lateral extension 39 which is disposed below the longitudinal bar 21 of the frame 20 of the unit with which it is associated. The bell crank levers 37 when rocked about their fulcrums are adapted to have their extensions 39 engage with the longitudinal bars 21 of the frame 20 for lifting the frame 20 and its parts up and away from the ground. Suitable means is provided for operating these levers 37 and preferably although not necessarily common operating means is provided for the levers for the units. This common operating means may comprise a bail 40 having a body portion 41 provided with an extension or bracket 42 pivotally connected at 43 with a hand lever 44, hand lever 44 being fulcrumed upon a bracket 44$^a$ carried by the seat S of the vehicle. Of course the seat S is mounted on the main frame 14. The arms 45 of the bail 40 are pivotally connected, as at 46, with the vertical arms of the bell crank levers 37 thus when the hand lever 44 is manipulated the bail 40 is moved backwardly and forwardly in a horizontal plane to raise and lower the extension 39 thereof accordingly as the hand lever 44 is moved in one or the other direction. The purpose of providing the extension 39 is to enable the lifting mechanism to be operative irrespective of the lateral or sidewise adjustment of the units and of course this extension is of sufficient length to engage the bars 21 in any sidewise adjustments of the units.

Knocker bars 50 are provided and are preferably two in number, these knocker bars being common to both units and being arranged to extend transversely and horizontally of the machine and longitudinally spaced from each other. They are adapted to engage the cotton as the machine is advanced and to bend the same so that when the cotton springs back after disengaging the bars 50 the insects will be shaken or dislodged from the plant. Preferably these bars are supported for vertical adjustment so as to be adapted for effective use with cotton plants of various sizes. In carrying out these purposes the bars 50 operate in vertical slots 51 provided therefor in the plates 24 of the elongated units and are carried at lower ends of rectangular frames 52, the vertical bars 53 of which are slidably mounted in sockets 54 provided therefor on the main frame 12. Obviously when the frames 52 are moved or adjusted vertically the knocker bars 50 carried by these frames will also be vertically adjusted. Means is provided for releasably holding the frames 52 in any position to which they may be adjusted and preferably such means includes a standard 55 for each frame 52 and a resilient clamp member 56 adjustably mounted on the standard 55 and adapted to be clamped in any vertical adjustment thereon by a hand screw 57. The clamp carries a hook 58 which engages the top member of the adjacent rectangular frame 52.

Means is provided for treating the plants with poison and may comprise apparatus for spraying the plants with a solution of poison or means for spraying the plants with poison in powdered form. If a solution of the poison is employed a tank 60 is provided containing the solution and is supported by bands 61 and brackets 62 on the cross bars 17 and 18 of the main frame. From the tank 60 valve controlled distributing pipes 63 extend and terminate in spray nozzles 64, the spray nozzles being supported by a bracket 65. Compressed air or other suitable means is utilized for effecting a force feed of the solution of poison, and for this purpose a pump 67 is provided and may be conveniently mounted on the tank 60. The plunger rod of the pump is shown at 68 and is pivotally connected to the operating lever 69, the outer end of which is pivoted to one end of a connecting rod 70, the opposite end of the connecting rod being pivotally secured, as at 71, to a crank 72 provided in a shaft 73. The shaft 73 is driven from the ground wheels 10 which for this purpose carry ring gears 74 meshing with pinions 75 mounted on the outer ends of the shaft. One-way clutch arrangements are provided for connecting the gears 75 to the shafts 73 and may take any suitable form. For the sake of illustration it may comprise one or more pawls 76 pivotally mounted upon gear pinions and coacting with ratchet collars 77 fixed to the shaft 73. In this manner the ground wheel operating means is provided for effecting a force feed of the poison.

In lieu of providing a pump or tank a powder container and blower may be provided for subjecting the plants to a spray of poison powder.

In use, the machine is driven in any suitable manner across the cotton field and the cotton plants of the adjacent rows pass through the passages 29 of the exterminating units. The cotton plants are first encountered by the knocker bars 50 which strike the plants and bend them over. As the knocker bars pass over the plants, the plants spring back due to their inherent and natural resiliency, and this action shakes the insects from the plants and throws them into the pans 27 or against the plates 24 from which they are fed into the pans. The inclined ends 28 at the forward end of the pans 27 insure the proper disposition of the cotton plants or of the exterminating units so that the plants are accommodated in the passage 29. It is to be noted that the exterminating units are freely shiftable sidewise to accommodate themselves to irregularities in the rows of cotton, the units being freely slidable on the bars 16, 17 and 18 for this purpose. Moreover they are readily adjustable vertically to accommodate themselves to irregularities in the contour of the ground. For instance if a raise in the ground is encountered the pans 28 act as shoes or runners and ride up over the same and the necessary vertical movement may be had by virtue of the provision of the slots 30, 31 and 32 which permit the side plates 24 to move relative to the bars 16, 17 and 18.

While the cotton plants are in the substantially closed space defined by the plates 24 and pans 27 they are, by means of instrumentalities on the top of the machine, treated with the poison. If a solution is employed they are treated with a continuous spray from the nozzles 64. Not only the plants are treated with the spray but also the ground around the plants and the plates 24 and the pans 27. Moreover the feed of this spray is dependent on the travel of the vehicle so as to be in proper proportion to the number of plants treated. In this manner a reliable and efficient exterminator susceptible of convenient and economical upkeep is provided and is adapted for equally effective use under the varying conditions met with in actual use.

While we have herein shown and described the preferred embodiment of our invention, it is to be understood that we do not limit ourselves to the precise construction herein set forth as various changes in the form, proportion and minor details of construction may be resorted to without departing from the spirit of the invention or the spirit and scope of the appended claims.

We claim:

1. In an exterminator of the character described, a wheeled frame including cross bars and an exterminating unit mounted thereon and each including a pair of plates having slots in which the cross bars are loosely fitted whereby the exterminating unit is mounted for limited vertical movement and for lateral movement on said cross bars.

2. In an exterminator of the character described, a frame, ground wheels supporting the same, a pair of exterminating units mounted on the frame, each exterminating unit including a pair of downwardly converging plates and pans carried by the lower portions of the plates, the pans defining a passage accommodating the plants to be treated, knocker bars for the units, and means for spraying poison between the plates of each unit, the downwardly converging plates collecting a portion of the poison sprayed so as to exterminate the insects displaced onto the plates and into the pans.

3. In an exterminator of the character described, a wheeled main frame, a pair of exterminating units carried thereby, a plurality of knocker bars common to said exterminating units and extending transversely through the same and in horizontally spaced relation, means for mounting said knocker bars for vertical adjustment, said means including a pair of rectangular frames carrying said knocker bars and having vertical bars, said main frame having sockets in which said vertical bars are slidably fitted, a standard carried by the main frame adjacent each of said rectangular frames, and clamping means connected with the rectangular frame and coacting with the standard for holding the rectangular frames in any position to which they may be adjusted.

4. In an exterminator of the character described, a wheeled frame, an exterminating unit carried by the frame and free to partake of limited vertical or lateral movement with respect to said frame and a lifting device carried by the wheeled frame and engageable with the exterminating unit in such manner as to positively lift the same and yet leave the exterminating unit free to partake of vertical or lateral movement independent of the lifting device.

DANIEL HOOK WOODWARD.
JULIAN SIDNEY CHAMBERS.